United States Patent
Kosiak

Patent Number: 5,835,007
Date of Patent: Nov. 10, 1998

[54] METHOD AND APPARATUS FOR CRASH SENSING USING ANTICIPATORY SENSOR INPUTS

[75] Inventor: Walter Kirk Kosiak, Kokomo, Ind.

[73] Assignee: Delco Electronics Corporation, Kokoma, Ind.

[21] Appl. No.: 799,063

[22] Filed: Feb. 10, 1997

[51] Int. Cl.⁶ .................................................... B60Q 1/00
[52] U.S. Cl. ................................... 340/436; 364/424.056
[58] Field of Search ...................................... 340/436, 669; 364/424.045, 424.055, 424.056; 342/72; 280/735, 737, 749

[56] References Cited

U.S. PATENT DOCUMENTS

| | | | |
|---|---|---|---|
| 4,673,937 | 6/1987 | Davis | 342/72 |
| 5,394,326 | 2/1995 | Liu | 340/436 |
| 5,432,516 | 7/1995 | Cherry et al. | 340/436 |
| 5,483,449 | 1/1996 | Caruso et al. | 364/424.056 |
| 5,504,379 | 4/1996 | Mazur et al. | 340/436 |
| 5,508,918 | 4/1996 | Gioutsos | 340/436 |
| 5,541,842 | 7/1996 | Gioutsos et al. | 340/436 |
| 5,546,307 | 8/1996 | Mazur et al. | 364/424.056 |
| 5,558,370 | 9/1996 | Behr | 280/806 |
| 5,581,232 | 12/1996 | Tanaka et al. | 340/436 |
| 5,587,906 | 12/1996 | McIver et al. | 340/436 |
| 5,748,477 | 5/1998 | Katoh | 340/436 |

Primary Examiner—Jeffery A. Hofsass
Assistant Examiner—John Tweel, Jr.
Attorney, Agent, or Firm—Jimmy L. Funke

[57] ABSTRACT

Anticipatory crash sensors mounted on the front of a vehicle or optionally on the sides sense the speed of approach to an obstacle. A signal processing algorithm determines the ratio of the speed to a threshold and multiplies the output of an accelerometer with the ratio. This enhanced acceleration signal is input to a single point crash sensor algorithm to reduce the time to generate a trigger signal.

14 Claims, 3 Drawing Sheets

METHOD AND APPARATUS FOR CRASH SENSING USING ANTICIPATORY SENSOR INPUTS

FIELD OF THE INVENTION

This invention relates to detecting crashes in vehicles and particularly to the method and apparatus for enhancing such detection using anticipatory sensors.

BACKGROUND OF THE INVENTION

Presently, electronic crash sensors employ solid-state accelerometers to detect and discriminate crash events. This sensor technology reliably provides airbag and seatbelt pretensioner triggering.

Anticipatory crash sensors have been investigated since the early 1970's. Potentially, reliable anticipatory crash sensing could eliminate the typical integration time required to sense and discriminate the impact and thus permit activation of the airbags and seatbelt pretensioners at first contact or even prior to impact.

Certainly, the greatest benefit is to be gained when the anticipatory crash sensor can autonomously trigger the activation of the restraints prior to the impact. However, an improper decision by an anticipatory crash sensor in this configuration might, conversely, have adverse consequences. An improper no-trigger decision might fail to protect the occupant when needed, while a false trigger command might result in an unnecessary deployment.

All of the anticipatory sensors proposed in the past have suffered from the inability to reliably classify impending collisions as being hazardous or non-hazardous. This implies that the target must be classified according to its size and mass, since crash severity is proportional to the relative energy transferred during the collision. Some non-hazardous, stationary targets having low mass, but large sensor signal reflectivity, can look the same as a hazardous, parked car. Conversely, hazardous, stationary targets such as poles and trees provide little signal reflection and are, as a result, difficult for the sensor to detect.

Anticipatory sensors using radar or other radiation sensing technologies are already known for use in vehicles equipped with intelligent cruise control (ICC) and collision warning/collision avoidance systems. An example of such radar application is given in the U.S. Pat. No. 4,673,937 to Davis entitled "Automotive Collision Avoidance and/or Air Bag Deployment Radar", which is incorporated herein by reference.

Accelerometers are used in single point sensors to provide a crash deceleration pulse for evaluation by a crash sensing algorithm commonly used for inflatable supplemental restraints. It has been proposed to employ an anticipatory sensor along with an accelerometer to provide inputs to a crash algorithm to use pre-crash data in the determination of when to activate restraints. One such proposal is described in the U.S. Pat. No. 5,558,370 to Behr entitled "Electronic Seat Belt Tensioning System". It is thus known to be desirable to accommodate both types of sensor inputs in such an algorithm.

Since the anticipatory sensors are not ideal, one must take care in choosing how to modify the crash sensing algorithm based on the reliability and robustness of information available from the ICC forward-looking sensor. In the case of a radar sensor, for example, there is typically a minimum distance where they are operative, say 3–5 meters; also the most reliable pre-crash data is closing speed of the vehicle relative to an obstacle, and that speed may change somewhat before impact occurs. The following requirements are important for the resulting system:

1. The crash algorithm must not have degraded performance in cases where the anticipatory sensor is inoperative or does not detect the impacting object. This assumption inherently nullifies the potential benefit of using the anticipatory crash sensor to improve immunity to rough road and other misuse events.
2. The crash sensor algorithm must not have degraded performance due to the additional tolerances of the anticipatory sensor when added to the existing tolerances of the single point sensor.

Accordingly, the problem of combining the pre-crash information with the crash deceleration pulse is not a straightforward one.

SUMMARY OF THE INVENTION

It is therefore an object of the invention to combine information from an anticipatory sensor and an accelerometer in a manner to improve the performance of a crash sensing algorithm. Another object is to make such an improvement without degrading the performance due to sensor tolerances.

In the case of a supplemental inflatable restraint (SIR) system, the preferred sensing system is a single point sensor which includes an accelerometer for producing acceleration information including a crash deceleration pulse and a microprocessor programmed with a crash sensing algorithm. The sensing system is coupled to a firing circuit for deploying air-bags when a crash event is confirmed by the algorithm. The invention is carried out by modifying the acceleration information as a function of pre-crash closing speed as determined by an anticipatory sensor, thereby discriminating the severity of the crash and activating the restraints accordingly.

Anticipatory sensors are typically mounted on the front of the vehicle and use radar, infrared, light or ultrasonic technology to view the region in front of the vehicle and generate a signal representing the closing speed of the vehicle relative to an obstacle until the vehicle is a minimum distance from the obstacle (about 3 meters in the case of radar). The closing speed at that distance is regarded as the pre-crash closing speed. A signal processing algorithm normalizes or determines the ratio of the pre-crash closing speed to a threshold (say, about 12 or 15 mph) and multiplies the acceleration signal by the ratio. The resulting enhanced acceleration signal is thereby increased for high pre-crash closing speeds. The enhanced acceleration signal is applied to the crash algorithm which is then able to more quickly trigger restraint activation for high pre-crash closing speeds.

Limits may be applied to the ratio to ensure against degraded performance or hypersensitivity to no-trigger conditions.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is based on a development which uses an anticipatory crash sensor (ACS) which is preferably radar but which alternatively could use infrared, light or ultrasonic technology. A specific example of a radar type of ACS is that described in the above-mentioned U.S. Pat. No. 4,673,937.

Figure 1:
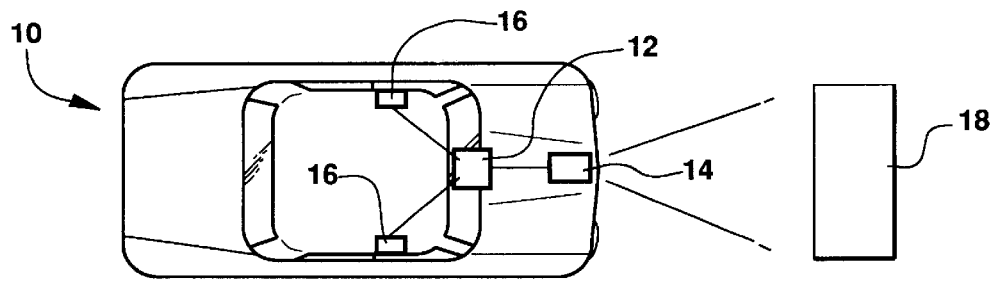
FIG. 1 is a schematic view of a vehicle equipped with a crash sensor and anticipatory crash sensors.

Referring to FIG. 1, a vehicle 10 is equipped with a single point crash sensor 12 coupled to a front anticipatory crash sensor (ACS) 14 and optional side ACS units 16. The side ACS units detect the approach of vehicles or other objects from the side. Although the invention contemplates the use of side sensors as well as front sensors, the ensuing description will be directed primarily to front sensors, the application being similar in either case.

The front ACS 14 monitors the area in front of the vehicle to detect an obstacle 18 which may present a collision hazard. The pre-crash closing speed, which is the speed of the vehicle relative to the obstacle, or other dynamics can be accurately measured by radar, infrared laser or ultrasonic technology, for example. Radar is useful for monitoring the frontal scene for more than 100 meters down to about 3 meters. Only the nearest reading is of importance to the crash sensing system since it yields the best information about the crash dynamics. It must be noted, however, that even in the space of 3 meters the relative speed of the vehicle and obstacle can change greatly due to braking and other maneuvering.

Figure 2:
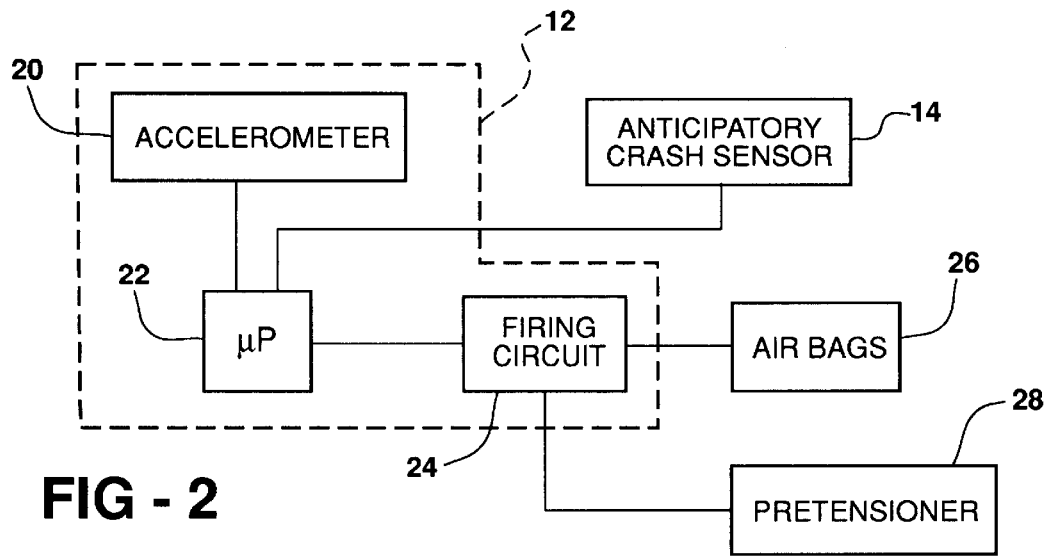
FIG. 2 is a diagram of the crash sensor of FIG. 1 along with restraints to be activated.

The single point crash sensor 12, further shown in FIG. 2, comprises an accelerometer 20 sensitive to acceleration in the longitudinal axis of the vehicle, a microprocessor 22 for evaluating the acceleration to trigger a firing circuit 24 when a crash event is occurring and its severity is sufficient to warrant such measures. As thus far described, the crash sensor 12 is like those in common usage and need not be described in detail. Air bags 26 and/or seat belt pretensioners 28 are activated by the firing circuit, as is well known. The ACS 14 is coupled to the microprocessor 22 where its pre-crash closing speed information is used to help discriminate crash severity.

Figure 3:
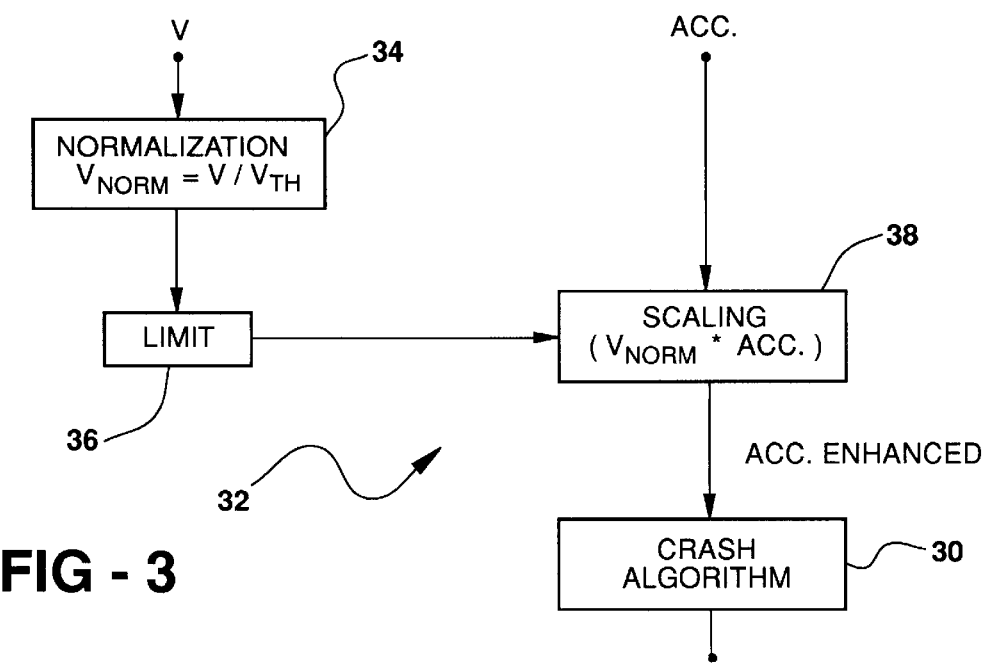
FIG. 3 is a flow chart illustrating an algorithm for combining preimpact information and acceleration data, according to the invention to yield enhanced crash algorithm performance.

Referring to the flow chart of FIG. 3, a conventional crash algorithm 30 embodied in the microprocessor 22, which heretofore normally determined deployment of restraints solely on the basis of the accelerometer output data now, is supplied an enhanced acceleration value by a signal processing algorithm 32. The signal processing algorithm 32 has two input signals, pre-crash closing speed V from the ACS 14 and acceleration Acc from the accelerometer. A normalization block 34 receives the speed V and normalizes the speed relative to a preset threshold $V_{TH}$. The threshold is chosen to be about 12 or 15 mph and the normalized speed $V_{NORM}$ is the ratio $V/V_{TH}$. Preferably maximum and minimum limits are placed on the ratio in block 36. A scaling block 38 receives the acceleration signal and multiplies it by $V_{NORM}$ to yield an enhanced acceleration value which is supplied to the crash algorithm 30.

The basic enhancement afforded by the signal processing algorithm 32 is to utilize the normalized impact velocity from the ACS 14 to scale the acceleration waveform prior to its use in the crash algorithm. This approach can be used by all types of sensing algorithms: front, rear, side, time-dependent, and time-independent. The minimum scale factor (ratio) can be set by the limit block to 1×. This permits the crash algorithm to operate without degraded performance in the case of an inoperable ACS or an undetected obstacle. Similarly a maximum scale factor, say, 2× or 3× should be assigned in order to protect against anticipatory sensor "false alarms" from overly sensitizing the algorithm to non-severe conditions.

Figure 4:
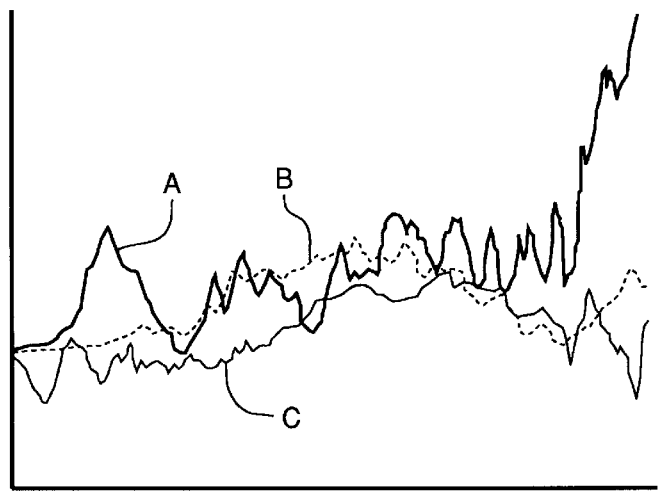
FIG. 4 is a graph of acceleration signals as generated by an accelerometer.
Figure 5:
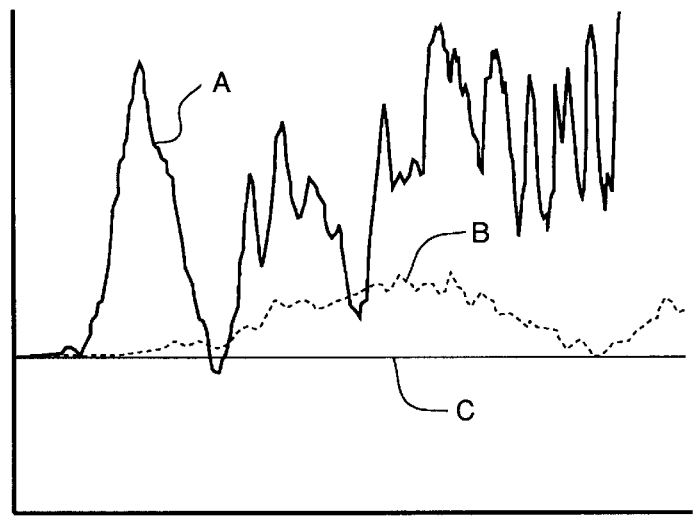
FIGS. 5 and 6 are graphs of enhanced acceleration signals illustrating the effect of the invention.
Figure 6:
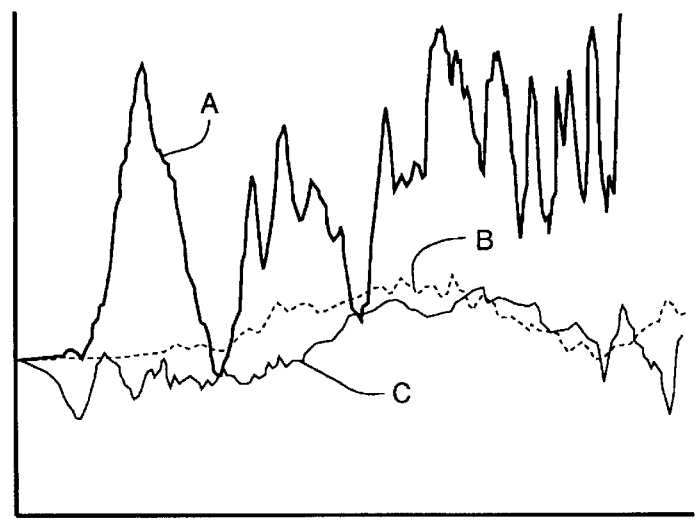

FIGS. 4–6 illustrate the results of the signal processing algorithm obtained in computer simulation tests. In this case no limits were applied to the scaling factor. This approach is valid when it can safely be assumed that the ACS can always correctly sense the pre-crash closing speed. FIG. 4 shows three non-enhanced acceleration signals Acc, identified as A, B and C. Signal A is a typical waveform for a 30 mph offset pole impact, signal B is the waveform resulting from a 9 mph frontal barrier impact, and signal C is a waveform due to traveling at 30 mph on a rough road. The threshold $V_{TH}$ is set at 12 mph which is the deployment threshold for frontal barrier tests, although other values can be chosen. FIGS. 5 and 6 show the results of applying the signal processing algorithm. Signal A is scaled (multiplied) by 2.5 (30mph/12mph) which clearly sets it apart from the other signals which are not increased to improve discrimination. The increased signal A also advances the trigger point to an earlier time since the acceleration appears to be greater. Signal B is scaled by 0.75 (9mph/12mph) and thus is a little smaller than the original signal B to suppress its effect due to the low speed. In FIG. 5, signal C is zero for the case where the ACS senses no obstacle and the speed ratio is zero. In FIG. 6 the signal C is the same as in FIG. 4 for the case where the ACS senses an object at a closing speed of 12 mph, yielding a ratio of 1.

Computer simulations of crashes using the invention revealed a 30% or greater reduction of trigger time for a wide variety of frontal crash conditions at speeds above the threshold and even better reduction for impact with a pole. Similar simulations of side impact conditions did not yield substantial reductions of trigger time except in the case of poles where reductions of over 50% were noted.

Figure 7:
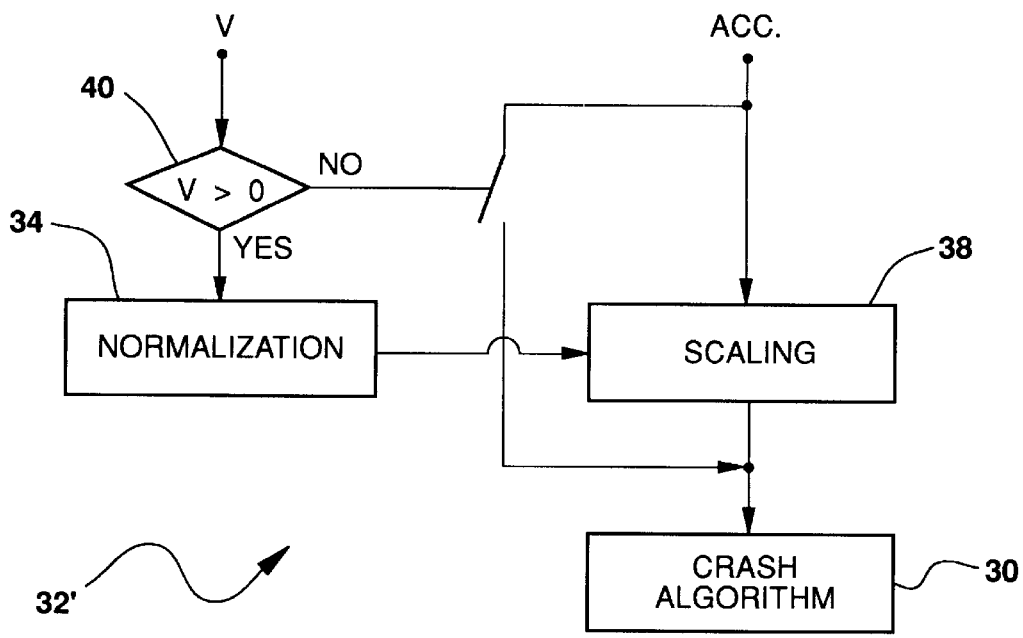
FIGS. 7 and 8 are additional embodiments of signal processing algorithms according to other embodiments of the invention.

Another signal processing algorithm 32' is useful where it is assumed that the ACS either correctly senses the pre-crash closing speed or misses it entirely. As shown in FIG. 7, a decision block 40 is inserted prior to the normalization block 34, and controls a bypass of the scaling block 38. A limit block may be used as in FIG. 3, if desired. The decision block 40 compares the pre-crash closing speed V to zero. If the ACS senses a speed, V is then greater than zero, the bypass will be open and the signal processing algorithm 32' performs the same as that of FIG. 3. If the ACS misses the obstacle the sensed speed will be zero, and the output of the decision block 40 will close the bypass to nullify any scaling. Then the original acceleration signal will be applied to the crash algorithm ensuring there will be no degradation of performance.

Figure 8:
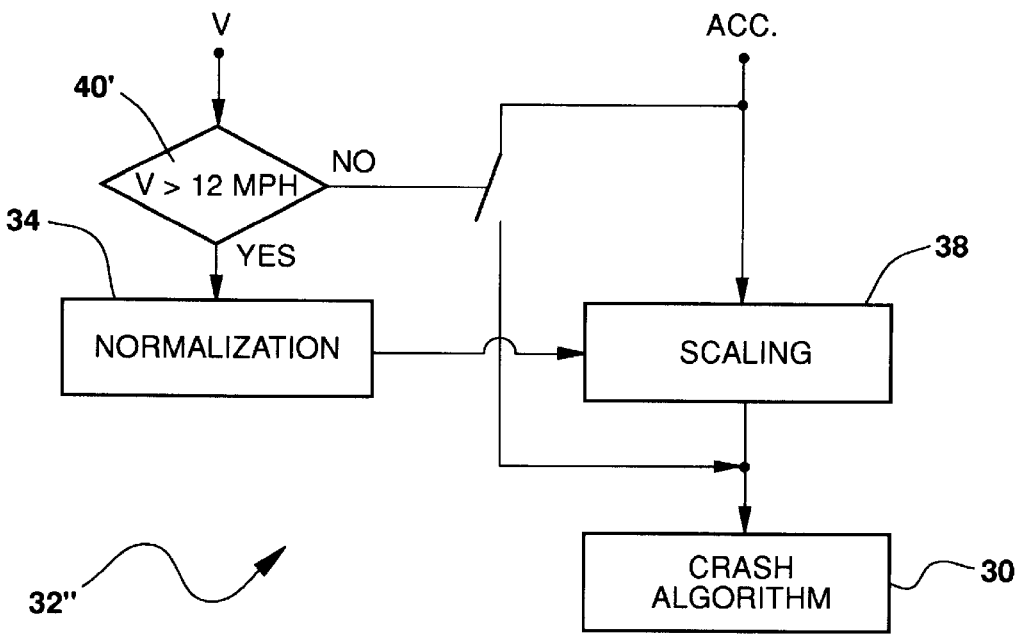

Still another signal processing algorithm 32" (FIG. 8) can be used where is assumed that the sensor may not measure the fall closing speed, so that a 30 mph pre-crash closing speed is read out as a lower speed, say 18 mph. The algorithm 32" is arranged like that of FIG. 7 but the decision block 40' compares the speed to 12 mph. Then higher speeds will be normalized and used in scaling to enhance the acceleration signal to the extent that the perceived speed is above the threshold $V_{TH}$. For speeds lower than 12 mph, the decision block 40' will close the bypass to cause the acceleration signal to be applied directly to the crash algorithm 30.

It will thus be apparent that the use of both acceleration and precrash closing speed signals as combined in the signal processing algorithm greatly improves the operation of an acceleration-based single point crash sensing algorithm to reduce trigger time at high speeds and also to allow better discrimination of high and low severity crashes to better determine whether to deploy an air bag or activate another restraint.

It is recognized that a sensor capable of very near range sensing would permit calculation of the exact time of impact and it would reduce the variation possible in impact speed since last minute maneuvering is accounted for. Additionally, one might consider utilizing two sensors spaced across the front of the vehicle in order to gain knowledge of whether the impending impact is a full frontal or localized impact, as well as being able to determine the exact point of impact and the angle of the impact. The single point sensor algorithm performance could be improved in each of these cases.

The embodiments of the invention in which an exclusive property or privilege is claimed are defined as follows:

1. A method of controlling a vehicle occupant restraint system having a pre-impact obstacle detection sensor for detecting an obstacle prior to an impact between the vehicle and the obstacle, and an accelerometer for detecting acceleration of the vehicle due to the impact between the vehicle and the obstacle, the method comprising the steps of:

determining a relative speed between the vehicle and the obstacle prior to said impact based on a signal produced by said pre-impact obstacle detection sensor;

determining an acceleration value due to said impact based on a signal produced by said accelerometer;

modifying the determined acceleration value as a function of the determined relative speed to produce a modified acceleration value;

applying the modified acceleration value as an acceleration input to a crash sensing algorithm; and controlling activation of an occupant restraint in accordance with the crash sensing algorithm.

2. The method of claim 1 wherein the step of modifying the acceleration value comprises adjusting the amplitude of the acceleration value as a function of the determined relative speed.

3. The method of claim 1 wherein the step of modifying the acceleration value comprises increasing the amplitude of the acceleration value as a function of the determined relative speed.

4. The method of claim 1 wherein the step of modifying the determined acceleration value comprises the steps of:

establishing a pre-impact relative speed threshold;

determining a ratio of the determined relative speed to the pre-impact relative speed threshold; and multiplying the determined acceleration value by the ratio.

5. The method of claim 1 wherein the step of modifying the determined acceleration value comprises the steps of:

establishing a pre-impact relative speed threshold;

determining a ratio of the determined relative speed to the pre-impact relative speed threshold; and when the determined relative speed exceeds the pre-impact relative speed threshold, multiplying the determined acceleration value by the ratio.

6. The method of claim 1 wherein said pre-impact obstacle detection sensor is a radar sensor.

7. The method of claim 1 wherein the step of determining a relative speed between the vehicle and the obstacle includes the steps of:

determining a distance between the vehicle and the obstacle based on the signal produced by the pre-impact obstacle detection sensor; and determining a relative speed between the vehicle and the obstacle based on the signal produced by the pre-impact obstacle detection sensor when the determined distance is equal to a predefined distance.

8. A restraint system in a vehicle for activating a restraint in the event of a severe crash between the vehicle and an obstacle, comprising:

a pre-impact obstacle detection sensor for detecting an obstacle in a path of the vehicle prior to an impact between the vehicle and the obstacle;

an accelerometer for producing acceleration data based on a detected acceleration of the vehicle due to the impact between the vehicle and the obstacle;

restraint activation means including a crash algorithm for determining whether to activate said restraint based on an analysis of an acceleration signal supplied thereto;

means for determining a relative speed between the vehicle and the obstacle prior to said impact based on a signal produced by said pre-impact obstacle detection sensor;

means for modifying the acceleration data produced by said accelerometer as a function of the determined relative speed to produce a modified acceleration signal, and for supplying said modified acceleration signal to said crash sensing algorithm.

9. The system of claim 8 wherein the means for modifying the acceleration data comprises means for multiplying the acceleration data and a factor determined as a function of the determined relative speed.

10. The system of claim 8 wherein the means for modifying the acceleration data comprises enhancement means for determining the ratio of the determined relative speed and a threshold relative speed value and for multiplying the acceleration data and the ratio.

11. The system of claim 10 wherein the enhancement means includes means for limiting the ratio to values above unity, thereby avoiding degradation of performance of the crash sensing algorithm.

12. The system of claim 10 wherein the enhancement means includes means for limiting the ratio to values above unity and below about three.

13. The system of claim 8 wherein the pre-impact obstacle detection sensor comprises a radar sensing unit.

14. The system of claim 8, wherein the means for determining a relative speed between the vehicle and the obstacle comprises:

means for determining a distance between the vehicle and the obstacle based on the signal produced by the pre-impact obstacle detection sensor; and means for determining a relative speed between the vehicle and the obstacle based on the signal produced by the pre-impact obstacle detection sensor when the determined distance is equal to a predefined distance.

* * * * *